United States Patent [19]

Rester

[11] Patent Number: 4,509,162
[45] Date of Patent: Apr. 2, 1985

[54] HIGH DENSITY RECORDING MEDIUM
[75] Inventor: Marshall D. Rester, Anaheim, Calif.
[73] Assignee: Quixote Corporation, Chicago, Ill.
[21] Appl. No.: 449,489
[22] Filed: Dec. 13, 1982

Related U.S. Application Data

[63] Continuation of Ser. No. 201,554, Oct. 28, 1980, abandoned, which is a continuation-in-part of Ser. No. 64,177, Aug. 6, 1979, , which is a continuation-in-part of Ser. No. 43,429, May 29, 1979.

[51] Int. Cl.³ .......................... G11B 7/00; G11B 5/82
[52] U.S. Cl. .................................... 369/275; 369/283; 369/284; 369/286
[58] Field of Search ............... 369/109, 127, 125, 275, 369/280, 283, 284, 286

[56] References Cited

U.S. PATENT DOCUMENTS

| | | |
|---|---|---|
| 3,508,982 | 4/1970 | Sherin . |
| 3,634,150 | 1/1972 | Horn . |
| 3,705,055 | 12/1972 | Christensen et al. . |
| 3,894,179 | 7/1975 | Jacobs et al. . |
| 3,905,817 | 9/1975 | Bakewell . |
| 3,945,864 | 3/1976 | Goldsmith et al. . |
| 3,954,469 | 5/1976 | Avanzado et al. . |
| 4,057,831 | 11/1977 | Jacobs et al. ................... 369/275 X |
| 4,066,482 | 1/1978 | Shaw . |
| 4,069,094 | 1/1978 | Shaw et al. .. |
| 4,071,383 | 1/1978 | Nagata et al. . |
| 4,125,401 | 11/1978 | Spiertz et al. . |
| 4,155,735 | 5/1979 | Ernsberger . |
| 4,164,754 | 8/1979 | DuBuis . |
| 4,211,821 | 7/1980 | Hadni . |
| 4,258,126 | 3/1981 | Hiesinger . |
| 4,278,756 | 7/1981 | Bouldin et al. . |
| 4,279,669 | 7/1981 | Braun et al. . |
| 4,288,510 | 9/1981 | Tinet et al. . |

OTHER PUBLICATIONS

Bartolini, R. A., et al., "Review and Analysis of Optical Recording Media", Optical Engineering, vol. 15, No. 2, 3/1976.

Primary Examiner—Robert L. Richardson
Attorney, Agent, or Firm—Willian Brinks Olds Hofer Gilson & Lione Ltd.

[57] ABSTRACT

A process for making a radiation-reflecting record carrier, such as a video disc, is provided on which video and/or audio information is stored in an optically readable track in which first reflective areas alternate with second reflective areas, the two reflective areas having different effects on a reading beam in a playback machine so that the information recorded on the carrier may be recovered. The second reflective areas serve to direct the reading beam away from the path along which it is reflected by the first reflective areas. The process uses photographic techniques to form a master negative or positive, and to form record carrier replicas from the master.

In the disclosed embodiment of the method and apparatus of this invention, the second reflective areas of replica carrier are formed by raised crystalline deposits of a material such as silicon which are chemically deposited in a selected, optically generated pattern on the replica carrier.

15 Claims, 6 Drawing Figures

VIDEO DISC MASTERING

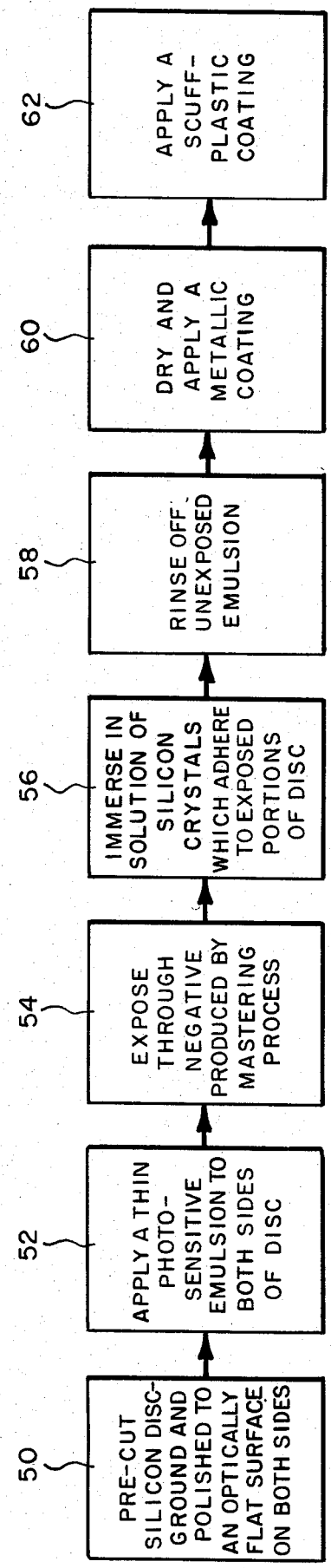

HIGH DENSITY RECORDING MEDIUM

BACKGROUND OF THE INVENTION

This application is a continuation of application Ser. No. 201,554, filed Oct. 28, 1980, and now abandoned, which is a continuation-in-part of co-pending application Ser. No. 64,177, filed Aug. 6, 1979, which, in turn, is a continuation-in-part of co-pending application Ser. No. 43,429, filed May 29, 1979.

The usual video disc type of radiation-reflecting record carrier is composed of a continuous spiral track which extends from the center of the disc towards its outer peripheral edge. The track on the video disc is analagous to the spiral groove on the usual audio record, but in reverse.

One type of commercially marketed prior art video disc includes a multiplicity of microscopic pits in the form of minute identations spaced along the spiral track. The prior art video disc is coated with light reflective material, and it is read by directing a reading light beam at the surface of the disc to be reflected thereby. The depth of the pits in the prior art video disc is precisely related to the wavelength of the light of the reading beam so that the light reflected from inside a pit will have a cancellation effect on the light in the beam. This causes the light reflected by the pits to be less bright than the light reflected by the areas between the pits. In this manner, the reading light beam is intensity modulated as the video disc rotates. The modulated beam is then detected in known electronic circuitry and transformed into corresponding electrical signals which may be reproduced in a conventional television receiver.

In the production of these prior art video discs it is usual first to produce a master disc which takes the form of a plate glass disc coated with photo-resist, the surface of which is pitted by a modulated laser beam to produce the recordings described above. The recording surface of the master disc is then metallized with an evaporated metal coating. A stamper is then produced which is a mirror image of the master disc, and replicas are formed from the stamper in large quantities in a special stamping or injection molding apparatus. A metal reflective layer is then applied to the surface of each replica, and a plastic scuff coating is applied over the reflective layer to form one side of the video disc. This side of the video disc is bonded to another side, formed in the same manner, to provide a complete video disc which has recorded video and audio information on each side.

In a typical prior art video disc of the type described above, the depth of each pit is of the order of 0.15 microns, and this dimension must be precisely maintained if the pit is to perform its function of modulating the intensity of the reading light beam. Because of the excessively close tolerance required in the depth of the pit, the useful life of the stamper is short and the rejection rate of replicas is high. Accordingly, these prior art video discs are expensive to produce and are high in cost.

A second prior art approach to the manufacture of video discs relies on photographic techniques to form light reflective data spots on a disc record. U.S. Pat. No. 4,090,031, for example, suggests that such spots may be formed by etching through a photoresist mask, although no details are given as to how this is to be accomplished in the mass production of replica discs. U.S. Pat. No. 3,381,085 discloses techniques for transferring data from a master disc to a copy disc or to a working master disc by photographic means. However, the data are recorded on the master disc in the latter patent in the form of a variable track of information having variable light transmissive characteristics, which is significantly different from the method of the present invention, as will become more apparent as the description proceeds. Moreover, U.S. Pat. No. 3,795,902 suggests generally that playback records may be made by chemical etching such as by using photoresist techniques, although, again, no details are given. These prior art photographic approaches to the manufacture of video discs produce data spots which are substantially two dimensional. Such two dimensional data spots are ill-suited to re-directing incident radiation along a path at angles to the path of the incident beam.

SUMMARY OF THE INVENTION

The video disc of the present invention, unlike the prior art video disc described above, provides a three dimensional recording medium which does not include microscopic pits. Instead, the video disc of the invention includes raised areas or lands, which replace the pits, and which serve to direct the reading beam away from the path along which the beam is reflected by the areas between the raised areas or lands. In this manner, the required intensity modulation of the reflected reading beam is achieved without the need for pits of a microscopically precise depth in order to achieve the modulation effect, as is the case with some prior art discs. Also, the replica discs of the present invention are produced by photo-optical techniques from a master negative or positive, which permits high precision continuous processing with a minimum of rejects as compared with the prior art stamping and injection molding processes for replica production.

According to the method of this invention, a microscopic pattern is formed on a surface of a substrate such that the surface is divided into at least first and second patterned regions. The surface of the substrate is then brought into contact with a material which selectively adheres to the first patterned region such that raised deposits of the material are selectively formed on the first patterned region, thereby altering the radiational characteristics of the first patterned region as compared with the second patterned region. Preferably, optical techniques such as the exposure and subsequent development of a radiation sensitive mask are used to form the first patterned region, and crystal growing techniques are used to form the raised deposits of a material such as silicon, for example.

The method of this invention can be used to produce a novel, high density recording medium which comprises a substrate having a surface and an array of microscopic structures deposited on the substrate on a reading axis, each of the structures comprising a crystalline deposit shaped to divert an incident beam of radiation, wherein digital information is recorded in the geometry of the structures along the reading axis. Preferably, each of the structures comprises silicon crystals, although other crystalline materials may be used as well. Upon playback of the preferred embodiment of the recording medium of this invention, the incident reading beam is reflected back on itself by the areas of the substrate between the crystalline deposits, and is deflected away from the path of the incident reading beam by the crystalline deposits.

The improved recording medium of this invention provides several significant advantages over the prior art described above. Because the raised deposits of this invention deflect incident radiation, the height of individual deposits is not critical to the proper functioning of the medium. In marked contrast, the prior art method of forming pits requires that pit depth be precisely controlled for proper operation. Furthermore, the medium of this invention includes three dimensional deposits which act to deflect incident radiation rather than merely to absorb or reflect it as in the prior art photographically generated recording media.

The medium of this invention is generated by means of optical and chemical methods, and therefore mechanical forming methods, such as stamping and molding operations, for example, can be eliminated entirely. By eliminating such mechanical forming methods, the manufacturing process is made independent of precise mechanical dimensions on stamping or molding equipment and therefore more reliable. Furthermore, masters and submasters used to produce the media of this invention are not subject to the wear and deterioration which is occasioned by stamping and molding operations.

The invention itself, together with further objects and attendant advantages, will best be understood by reference to the following detailed description taken in connection with the accompanying drawings.

BRIEF DESCRIPTION OF THE DRAWINGS

FIG. 4 is a block diagram of the various steps by means of which finished video replica discs may be produced in large quantities from the master produced by the process of FIG. 3, in accordance with a first preferred embodiment of the method of this invention.

DETAILED DESCRIPTION OF THE PRESENTLY PREFERRED EMBODIMENTS

Figure 1:
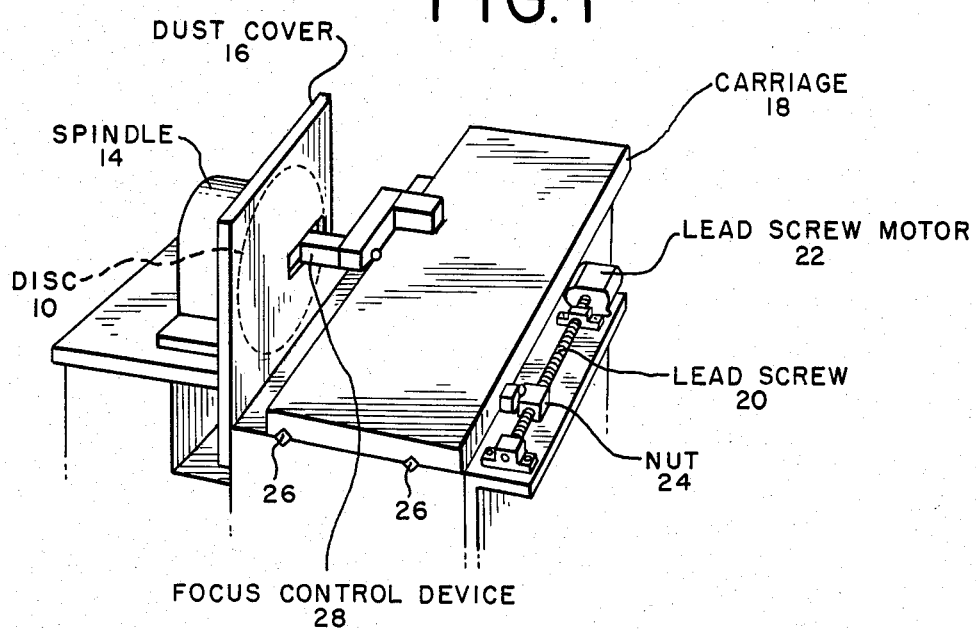
FIG. 1 is a schematic representation of apparatus by which a master disc may be formed in carrying out the concepts of the invention.
Figure 2:
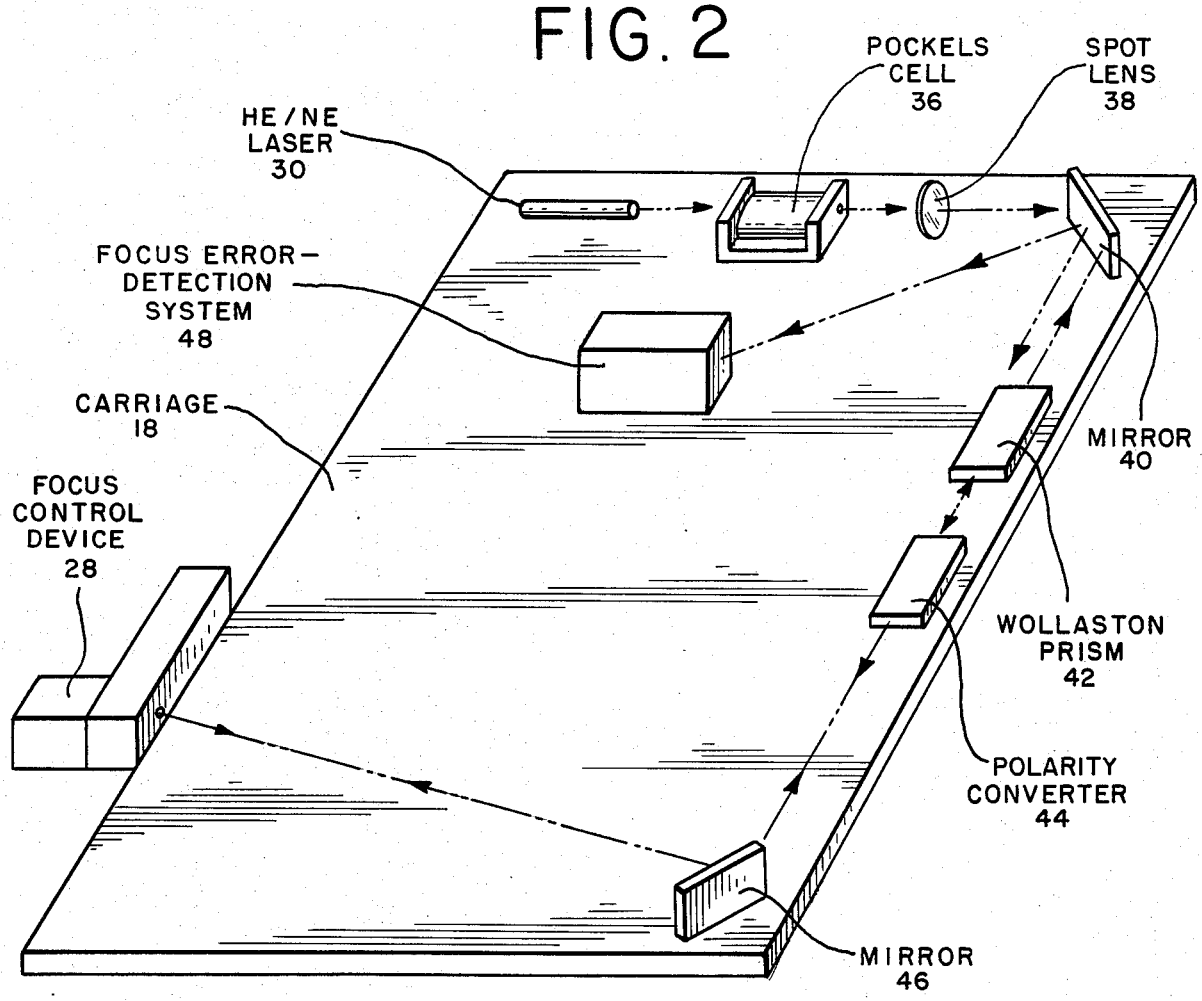
FIG. 2 is a detailed schematic representation of a movable carriage which is included in the apparatus of FIG. 1.
Figure 3:
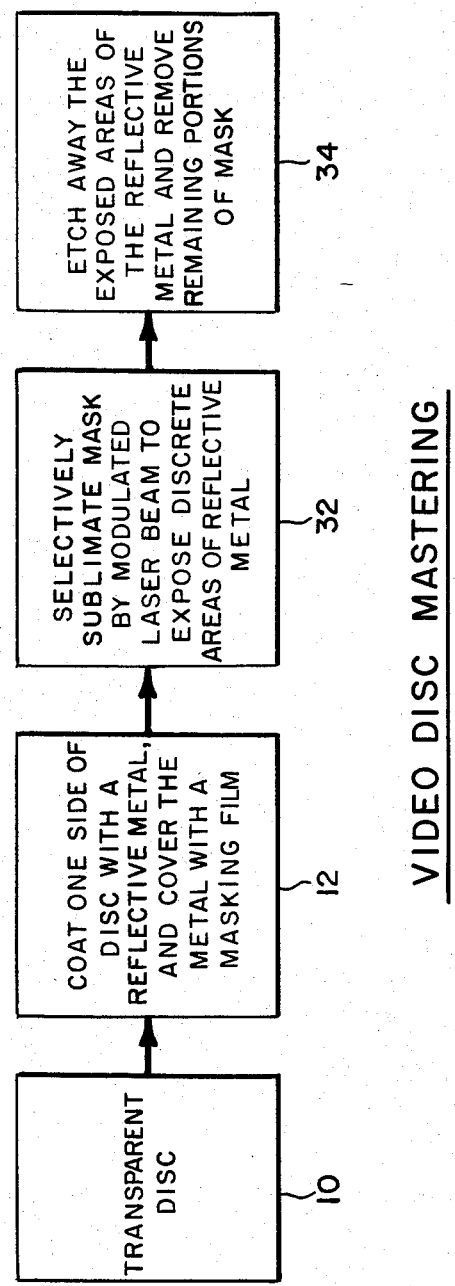
FIG. 3 is a block diagram showing the various steps of a mastering process by which a master video disc may be formed in carrying out the concepts of the invention.

Reference is now made to FIGS. 1, 2 and 3 for a description as to the manner in which a master disc is produced in carrying out the concepts of the present invention.

As represented by block 10 in FIG. 3, the video disc mastering process begins with the procurement of an optically flat transparent glass disc of, for example, twelve inches in diameter. The transparent glass disc is ground and re-ground with an extremely fine abrasive to remove all pits, and it is then optically polished and carefully cleaned. Then, as shown in block 31 of FIG. 3, the disc is coated on one side with a reflective metal, such as chrome, and the metal is then covered with a thin film mask, which may be formed of a photo-sensitive material, such as Shipley photo-resist No. 1350.

The metal may be deposited on the disc by any suitable method, such as vapor deposition, sputtering, or the like.

The disc 10 is then mounted on a spindle 14 (FIG. 1) which is driven by an appropriate motor, so that the disc may be turned about the axis of the spindle at a speed, for example, of 1800 rpm. The disc is enclosed in an appropriate dust cover 16. A carriage 18 is mounted on an appropriate frame, and the carriage is driven along rails 26 by a lead screw 20 which, in turn, is rotated by a motor 22, and threads through a nut 24 attached to the carriage. Focus control device 28 is mounted on the carriage, and an objective lens (not shown) is included in the device.

During the operation of the apparatus of FIG. 1, a modulated laser beam, derived, for example, from a helium/neon laser 30 (FIG. 2) mounted on the carriage 18, is directed to the objective lens in device 28. As the carriage 18 is moved by lead screw 20, and as the disc 10 rotates, the modulated laser beam selectively sublimates the mask on the disc 10 to form holes in the mask in accordance with the modulations of the laser beam, as represented by block 32 in FIG. 3, so as to expose discrete layers of the underlying metal layer. The power of the laser 30 is preferably chosen to be sufficient to sublimate the mask without vaporizing or melting the underlying metal layer. The exposed areas of the chrome are then removed by an acid or plasma etch to reveal corresponding transparent glass areas. The remaining portions of the mask are removed to reveal discrete reflective areas of the chrome, as represented by block 34 in FIG. 3. The result is a master video disc with reflective areas and transparent areas.

As shown in FIG. 2, a number of components are mounted on the carriage 18, so that a modulated laser beam may be directed to the objective lens in device 28, to sublimate the mask on the disc 10 in accordance with the modulations of the beam. The beam from the helium/neon laser 30 is passed through a Pockels cell 36. The Pockels cell is formed of electro-optical material in which the indices of refraction are changed directly by an applied electric field. The Pockels cell, which is formed of solid electro-optical material, can be replaced by a Kerr cell, which is formed of a liquid electro-optical material.

The video and audio information are combined into a frequency modulated signal, and the signal is applied to the Pockels cell 36 to modulate the laser beam. The Pockels cell alternately, partially blocks and passes the laser beam, so that the beam is appropriately modulated by the video and audio information, this being achieved in a manner known to the art. Specifically, all information, including video signals, audio signals, synchronizing signals, special code signals, and the like, is frequency modulated on a selected carrier signal having a center frequency of approximately 8 megacycles, and the modulated carrier is applied to the Pockels cell 36 to modulate the laser beam from laser 30.

The modulated laser beam then passes through a spot lens 38, and it is reflected by a mirror 40 through a Wollaston prism 42. The laser beam from Wollaston prism 42 is passed though a polarity inverter 44, and is reflected by a mirror 46 to the objective lens in the focus control device 28. In this manner, the focused modulated laser beam is directed to the disc 10, so that it may be moved effectively along a spiral track on the disc to expose the photo-sensitive film on the disc in accordance with the modulations of the beam.

The mask on the disc 10 does not absorb 100% of the focused beam, and some portion is reflected back to mirror 46, and through polarity converter 44 to the Wollaston prism 42. The Wollaston prism is, in reality, two prisms of birefringent material, such as quartz or calcite, cemented together to make a plane-parallel plate in which the optic axes of the two component prisms are mutually perpendicular and are parallel to the parallel faces of the plate.

The vertically polarized beam from mirror 40 passes through a Wollaston prism and is unaffected thereby. However, the horizontally polarized beam reflected back to the Wollaston prism from the polarity converter 42 is displaced from the beam from mirror 40, and the displaced beam is reflected by mirror 40 to a focus error detection system 48. The focus error detection system 48 is a known electronic circuit which includes photosensitive diodes which convert the reflected beam into electric signals. The resulting electric signals are used in known manner to control the focus control device 28, so as to maintain the laser beam focused at a selected plane within the disc 10. Other types of focusing controls may be used. For example, the focus control system illustrated and described in U.S. Pat. No. 3,969,575 (Gerritsen, et al.) is appropriate.

The process described above is one wherein the original program from any video source is recorded in real time as a geometrical pattern on a transparent master video disc by sublimating areas of the masking film on the disc at a real time rate. The resulting master video disc has an essentially two-dimensional surface, as compared with some prior art masters which have a three-dimensional surface from which the respective prior art replicates are molded or stamped.

The master itself can be used directly to produce video disc replicas in accordance with the process of the invention. However, less expensive sub-master discs may be made from the master, and the sub-master discs may be used to produce the replicas.

To form the sub-master disc a transparent glass disc is coated with a reflective metal and covered with a mask, such as a photo-sensitive resist. Then, the master disc is placed over the sub-master disc, and the mask on the sub-master is exposed by ultra violet light which passes through the master. The mask is then developed, and the unexposed portions of the mask are washed away to reveal discrete areas of the reflective metal. The discrete areas of the reflective metal are then etched away and appropriate etching and stripping steps are followed to produce the sub-master disc. The master and sub-master discs may be coated with an appropriate anti-reflective material.

As mentioned above, the master disc is preferably used to provide a number of less expensive sub-master discs, and the resulting sub-master discs are used to produce the video disc replicas of the present invention by photographic techniques, rather than by the prior art stamping or molding process. The resulting video disc replicas are capable of use with the prior art playback machines which presently are being used to play back the video information recorded by the formation of pits in the prior art video discs, as described above. An appropriate machine for reading the information on the preferred embodiments of video disc replicas produced in accordance with the present invention is, for example, the Magnavox Model VH8000 video disc player.

A first preferred method for making replicas of the present invention, by which the information recorded on the master negative is transferred photographically to each video disc replica, is represented by the block diagram of FIG. 4.

As shown by block 50 in FIG. 4, the first step in the production of a replica in accordance with this embodiment of the process of the invention is to pre-cut, for example, a 12-inch silicon disc, which is then ground and polished to an optically flat surface on both sides. The surface impurities are reduced by the polishing action to less than 0.1 microns in height. In the next step, as represented by block 52 in FIG. 4, a thin coating (of the order of less than 0.5 microns) of photo-resist is applied to both sides of the disc. Kodak Micro Resist 807 may be used for this purpose. The photo-resist on the disc is then exposed (block 54) through the negative produced by the mastering process described above. The resist is developed, and the exposed areas of the resist are removed. The exposing and developing steps, per se, are known to the art. The disc is then immersed in a tank containing silicon in an aqueous solution (block 56), and silicon crystals adhere to the portions of the disc previously covered by the exposed areas of the resist to form lands. The aqueous solution contains water and silicon in a ratio of the order of 2:1 to 5:1 by weight. The temperature of the solution is of the order of 80° F.–90° F. The technique of growing silicon crystals on a silicon substrate per se is known. Such growth is described, for example, in McGraw Hill Encyclopedia of Science and Industry, Vol 3, 1971 Edition. The resulting crystal lands are then etched for about 1 second, in a solution of hydrofluoric acid at room temperature. This causes the lands to assume a triangular shape. The hydrofluoric acid solution may, for example, be 1 part hydrofluoric acid and 10 parts water by weight. The height of the triangular lands is of the order of 1 micron, this height being achieved after a growing time of approximately 1–5 seconds.

The unexposed resist is then rinsed off the disc in a usual stripping tank containing an appropriate organic chemical, in accordance with the next step (block 58), leaving an optically flat surface with a pattern of minute crystal lands representing the information contained in the original negative. The disc is then rinsed and air dried, and a metallic reflective coating is applied, for example, by an appropriate vacuum deposition process (block 60). Finally, and as shown in block 62, a scuff-plastic coating is applied, and the disc is ready for packaging and distribution.

Figure 6:
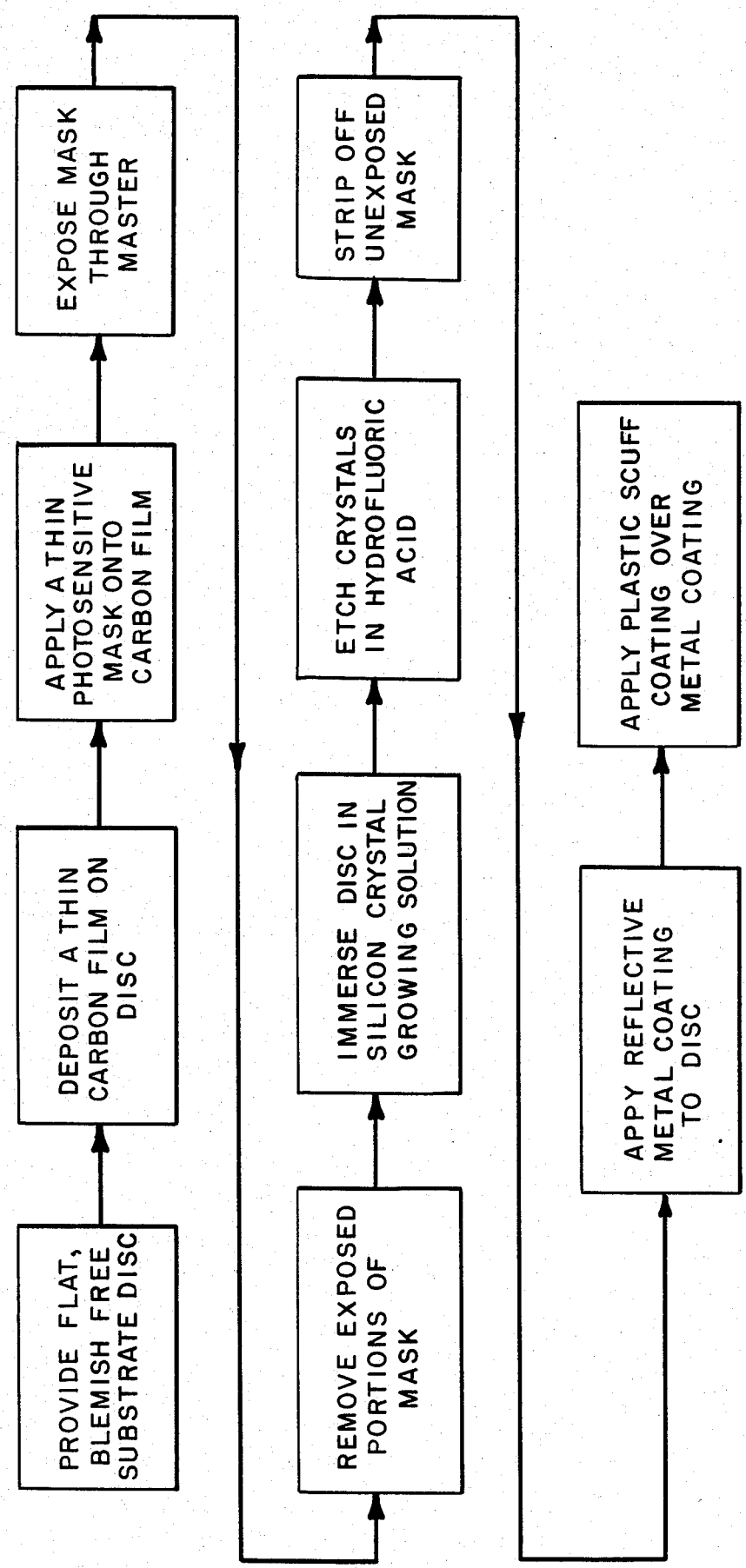
FIG. 6 is a block diagram of the various steps of a second preferred embodiment of the method of this invention for producing finished replica video discs.

A second preferred embodiment for making replicas of the present invention is represented by the block diagrams of FIG. 6.

The first step in the method of FIG. 6 is to provide a suitable substrate for the replica disc. Preferably, this substrate is a plastic disc, about twelve inches in diameter. The plastic of this disc should preferably be resistant to the stripping and developing solutions used in later steps of the method. In addition, this plastic should be dimensionally stable and not subject to excessive degassing when placed in a vacuum. The surfaces of the disc should be flat and substantially blemish free. A thin film of carbon is then vapor deposited on the substrate. Standard vapor deposition techniques are used to provide an even carbon film about 50–100 Angstroms in thickness.

The next step is to apply a thin film of a photo-sensitive material, such as Shipley photoresist #1350, for example, to form a photo-sensitive mask over the carbon film. Preferably, the thickness of the mask is maintained at about 0.5 microns. The mask is then exposed by directing collimated light through the master referred to above onto the mask.

The exposed mask is then developed using an appropriate development solution, in order to remove the exposed portions of the mask to reveal discrete areas of the underlying carbon film. After the mask has been developed, the disc is immersed in a tank containing silicon in an aqueous solution, and the silicon crystals nucleate on the distinct areas of exposed carbon film to form raised lands. Preferably, the aqueous solution contains water and silicon in a ratio of the order of 2:1 to 5:1 by weight, and the temperature of the solution is of the order of 80° F.-90° F. The technique of growing silicon crystals per se is known. Such growth is described, for example, in McGraw Hill Encyclopedia of Science and Industry, Vol. 3, 1971 Edition.

The resulting crystal lands are then etched for about 1 second in a solution of hydrofluoric acid at room temperature. This causes the lands to assume an approximately tetrahedral shape. The hydrofluoric acid solution may, for example, be 1 part hydrofluoric acid and 10 parts water by weight. The preferred height of the tetrahedral lands is of the order of 1 micron, this height being achieved after a growing time of approximately 1-5 seconds under the above described conditions. Preferably, the crystal growth time should be large enough to provide a mass of crystalline deposit suitable for etching but not so large as to form bridges between adjacent regions of the exposed carbon film.

After the crystal lands have been etched, the unexposed mask is then removed by rinsing the disc in a standard stripping solution, to leave a flat surface with a pattern of minute crystal lands representing the information contained in the original master. The disc is then rinsed and air dried, and a metallic reflective coating of a material such as chrome is then applied over the flat surface and the crystal lands. Standard vacuum deposition techniques are preferably used to apply the metallic reflective coating. Finally, a transparent scuff coating of plastic is applied over the reflective coating to protect the reflective coating, and the disc is then ready for packaging and distribution.

The crystal growing processes described above are advantageous, as compared for example to the process in which pits are formed in the replica discs, in that there is no precise tolerance required insofar as the height of the lands is concerned, as is the case with the depth of the pits. Furthermore, the reflective coating may tend to fill up such pits, adversely affecting their interference characteristics. The raised deposits produced by the methods described above are less subject to being adversely affected by the reflective coating. In addition, since the reflective coating is not applied until just before the scuff coating is applied in the methods described above, manufacturing is facilitated and the need for measures to protect the reflective coating in manufacture is reduced.

The process of the invention enables video disc replicas to be produced on an economical and commercially feasible basis with sufficient precision to enable the discs to be read in conventional playback machines to produce high quality video and audio signals, and yet to be sold at a relatively low cost.

Figure 5:
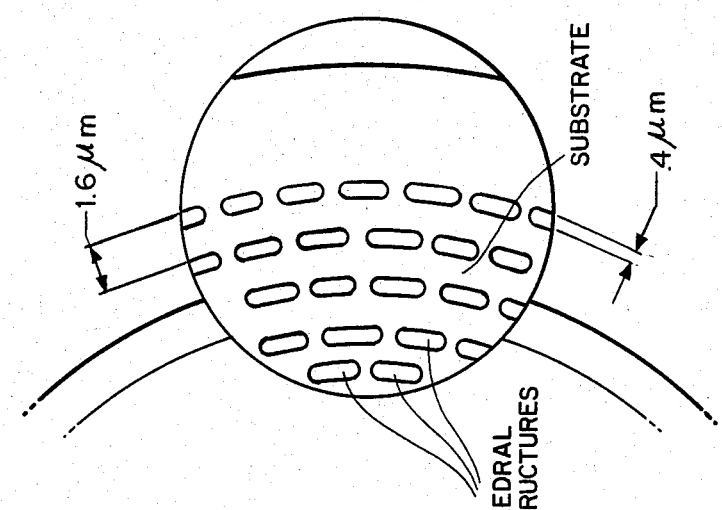
FIG. 5 is a schematic representation of the recordings on a preferred embodiment of a video disc produced by the method of FIG. 4 or FIG. 5.

As shown in FIG. 5, the resulting replica video disc produced by the methods of FIG. 4 or 6 is formed with the discrete areas representing the recordings on the master negative, the discrete areas being disposed in a pattern along a continuous spiral reading axis, or path, in the disc. In a particular embodiment, the discrete areas have a width of 0.4 microns, and each track in the spiral is displaced from the adjacent track by a distance of 1.6 microns. The discrete areas on the disc 10, in accordance with the present invention, are such that when the reading beam of a playback machine scans the spiral track on the disc, the beam is directed along a different path by each of the discrete areas, as compared with the path along which it is directed by each of the areas between the discrete areas. In this manner, the reading beam is modulated, so that the information recorded on the disc may be recovered. Because the entire surface of the replica disc of FIG. 5 is coated with a reflective coating, there are no light absorbing regions on the disc to absorb energy from the reading beam. In this way localized heating and concomitant distortion of the disc are minimized.

In the process described in conjunction with FIG. 4, the disc is immersed in a solution of silicon crystals which are grown on the exposed portions of the disc. Other techniques using the photographic negative master may also be used. For example, the reflective metallic coating may be applied to the replica disc prior to its being coated with the photo-resist, and after photographic exposure, through the photographic master negative, the replica may be sprayed or soaked in an acid solution which etches away the metal coating. The reading beam in the playback machine is reflected only by the metallic coating between the areas, so that the desired modulation of the beam may be achieved. Likewise, instead of removing the exposed metal coating by an acid solution, a chemical may be used which reacts with the exposed metal coating to create a light absorbing surface which, likewise, may be used to achieve the desired modulation of the reading beam in the play back machine. However, a transparent replica disc with light transmissive and light reflective areas is preferred, because of the tendency for the light beam to generate heat at the light absorbing areas. Such heat can have an adverse effect on the replica causing it to "wilt" and become distorted. This can particularly be a problem with plastic replica discs.

Of course, it should be understood that various changes and modifications to the preferred embodiments described above will be apparent to those skilled in the art. The foregoing description is intended to illustrate the invention rather than to limit it, and it is the following claims, including all equivalents, which define the scope of the invention.

I claim:

1. A high density recording medium comprising:
   a substrate having a surface;
   an array of microscopic structures deposited on the surface of the substrate along a reading axis, each of the structures extending above the surface and defining deflection surfaces tilted with respect to the surface to divert an incident beam of radiation wherein information is recorded in the pattern of the structures along the reading axis.

2. The invention of claim 1 wherein the structures comprise silicon crystals.

3. The invention of claim 2 wherein the structures have a substantially tetrahedral shape.

4. The invention of claim 1 further comprising:
   a reflective layer deposited over the microscopic structures and over regions of the surface between the microscopic structures.

5. The invention of claim 4 wherein the medium is a videodisc and the recorded information comprises video information.

6. The invention of claim 4 wherein the recorded information comprises audio information.

7. A high density recording medium comprising:
a substrate having a surface having optical properties such that an incident beam of radiation is directed in a first direction;
an array of microscopic, crystalline structures deposited on the surface of the substrate along a spiral reading axis, each of the crystalline structures shaped to reflect an incident beam of radiation away from the first direction in order to prevent the incident beam of radiation from being directed in the first direction, wherein information is recorded in the pattern of the structures along the reading axis.

8. The invention of claim 7 wherein the structures comprise silicon crystals.

9. The invention of claim 8 wherein the structures have a substantially tetrahedral shape.

10. The invention of claim 7 further comprising:
a reflective layer deposited over the microscopic structures and over regions of the surface between the microscopic structures.

11. The invention of claim 10 wherein the medium is a videodisc and the recorded information comprises video information.

12. The invention of claim 10 wherein the recorded information comprises audio information.

13. A disc comprising:
a substrate having a surface having optical properties such that an incident beam of optical radiation is directed in a first direction;
an array of microscopic, crystalline structures deposited on the surface of the substrate along a spiral reading axis, each of the crystalline structures extending above the surface and shaped to deflect an incident beam of optical radiation away from the first direction, wherein audio information is recorded in the positions and spacings of the structures along the reading axis; and
a reflecting layer disposed over the structures and the exposed portions of the surface between the structures;
said surface, structures and reflecting layer cooperating to reflect the incident beam in the first direction between the crystalline structures and to reflect the incident beam away from the first direction at the crystalline structures in order to permit remote optical sensing of the structures and detection of the audio information.

14. The invention of claim 13 wherein the structures comprise silicon crystals.

15. The invention of claim 13 wherein the structures have a substantially tetrahedral shape.

* * * * *